United States Patent
Tabirian et al.

(10) Patent No.: US 9,715,048 B2
(45) Date of Patent: *Jul. 25, 2017

(54) BROADBAND OPTICS FOR MANIPULATING LIGHT BEAMS AND IMAGES

(71) Applicants: The United States of America as Represented by the Secretary of the Army, Washington, DC (US); Beam Engineering for Advanced Measurements Co., Orlando, FL (US)

(72) Inventors: Nelson V. Tabirian, Winter Park, FL (US); Sarik R. Nersisyan, Maitland, FL (US); Brian R. Kimball, Shrewsbury, MA (US); Diane M. Steeves, Franklin, MA (US)

(73) Assignees: The United States of America as Represented by the Secretary of the Army, Washington, DC (US); Beam Engineering for Advanced Measurements Co., Orlando, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/739,240

(22) Filed: Jun. 15, 2015

(65) Prior Publication Data

US 2016/0033695 A1    Feb. 4, 2016

Related U.S. Application Data

(63) Continuation of application No. 13/916,627, filed on Jun. 13, 2013, now abandoned, which is a (Continued)

(51) Int. Cl.
G02B 5/18   (2006.01)
G02B 27/44  (2006.01)
G02B 27/42  (2006.01)

(52) U.S. Cl.
CPC ......... *G02B 5/1828* (2013.01); *G02B 5/1866* (2013.01); *G02B 27/4272* (2013.01); *G02B 27/44* (2013.01)

(58) Field of Classification Search
CPC .... G02B 1/08; G02B 5/18; G02B 2005/1804; G02B 5/1814; G02B 5/1828;
(Continued)

(56) References Cited

U.S. PATENT DOCUMENTS 3,721,486 A    3/1973   Bramley
6,792,028 B2   9/2004   Cook
(Continued)

OTHER PUBLICATIONS

S. R. Nersisyan, N. V. Tabiryan, L. Hoke, D. M. Steeves, B. Kimball, 'Polarization insensitive imaging through polarization gratings', Opt. Express, vol. 17, No. 3, Feb. 2, 2009, pp. 1817-1830.*

(Continued)

*Primary Examiner* — Arnel C Lavarias
(74) *Attorney, Agent, or Firm* — Brian S. Steinberger; Law Offices of Brian S. Steinberger, P.A.

(57) ABSTRACT

Optical systems for controlling with propagation of light beams in lateral and angular space, and through optical apertures. The light beams include laser beams as well as beams with wide spectrum of wavelengths and large divergence angles. The optical systems are based on combination of diffractive waveplates with diffractive properties that can be controlled with the aid of external stimuli such as electrical fields, temperature, optical beams and mechanical means.

11 Claims, 8 Drawing Sheets

Related U.S. Application Data continuation of application No. 12/697,083, filed on Jan. 29, 2010, now abandoned.

(58) Field of Classification Search
CPC .. G02B 5/1833; G02B 5/1866; G02B 5/1871; G02B 5/30; G02B 5/3016; G02B 5/3025; G02B 5/3083; G02B 5/32; G02B 26/08; G02B 26/0808; G02B 27/106; G02B 27/1086; G02B 27/28; G02B 27/283; G02B 27/286; G02B 27/42; G02B 27/4272; G02F 1/133528; G02F 1/133531; G02F 1/133538
USPC ..... 359/573, 558, 566, 569, 483.01, 485.05, 359/487.03, 489.01, 489.06, 489.09, 359/489.08, 489.15, 490.01, 490.02, 359/490.03; 349/1, 18, 193, 194, 201, 349/202; 362/19; 353/20

See application file for complete search history.

(56) References Cited

U.S. PATENT DOCUMENTS

| 7,319,566 | B2 | 1/2008 | Prince |
| 7,324,286 | B1 | 1/2008 | Glebov |
| 8,643,822 | B2 | 2/2014 | Tan |
| 9,557,456 | B2 | 1/2017 | Tabirian et al. |
| 2004/0165126 | A1 | 8/2004 | Ooi |
| 2008/0278675 | A1 | 11/2008 | Escuti |
| 2009/0073331 | A1 | 3/2009 | Shi |
| 2011/0075073 | A1 | 3/2011 | Oiwa |
| 2012/0188467 | A1* | 7/2012 | Escuti .............. G02B 27/286 349/1 |

OTHER PUBLICATIONS

Pending Claims for U.S. Appl. No. 14/162,809, filed Jul. 22, 2016.*

Sarkissian, et al., Periodically Aligned Liquid Crystal: Potential Application for Projection Displays, Mol. Cryst. Liq. Cryst., 2006, vol. 451, 19 pages.

Zel'Dovich, et al., Devices for Displaying Visual Information Disclosure, Jul. 2000, 10 pages.

Blinov, et al., Electrooptic Effects in Liquid Crystal Materials, Springer-Verlag New York, 1994, 17 pages.

Crawford, et al., Liquid Crystals in Complex Geomeries; Formed by Polymer and Porous Networks, Taylor and Francis, 1996, 4 pages.

Sarkissian, et al., Potential Application of Periodically Aligned Liquid Crystal Cell for Projection Displays, Optical Society of America, 2005, 3 pages.

Nersisyan, et al., Optical Axis Gratings in Liquid Crystals and Their Use for Polarization Insensitive Optical Switching, Journal of Nonlinear Optical Physics & Materials, Mar. 2009, vol. 18, No. 1, 47 pages.

McManamon, et al., A Review of Phased Array Steering for Narrow-Band Electrooptical Systems, Proceedings of the IEEE, Jun. 2009, pp. 1078-1096, vol. 97, No. 6, 19 pages.

Sarkissian, et al., Polarization-Controlled Switching Between Diffraction Orders in Transverse-Periodically Aligned Nematic Liquid Crystals, Optics Letters, Aug. 2006, vol. 31, No. 5, 4 pages.

Oise, Optics in the Southeast, Technical Conference and Tabletop Exhibit, Nov. 12-13, 2003, Orlando, Florida, Optical Society of America, 9 pages.

Oh, et al., A New Beam Steering Concept: Risley Gratings, Proc. of SPIE, Aug. 2009, 9 pages.

Wyant, Rotating Diffraction Grating Laser Beam Scanner, Applied Optics, May 1975, pp. 1057-1057, abstract, 1 page.

* cited by examiner

BROADBAND OPTICS FOR MANIPULATING LIGHT BEAMS AND IMAGES

CROSS REFERENCE TO RELATED APPLICATIONS

This application is a Continuation of U.S. patent application Ser. No. 13/916,627 filed Jun. 13, 2013, now abandoned, which is a Continuation of U.S. patent application Ser. No. 12/697,083, filed Jan. 29, 2010 and entitled "BROADBAND OPTICS FOR MANIPULATING LIGHT BEAMS AND IMAGES" now abandoned.

STATEMENT REGARDING FEDERALLY SPONSORED RESEARCH OR DEVELOPMENT

This invention was made with Government support under Contract No. W911QY-07-C-0032.

RIGHTS OF THE GOVERNMENT

The invention described herein may be manufactured and used by or for the Government of the United States for all governmental purposes without the payment of any royalty.

FIELD OF THE INVENTION

This invention relates to optical beam control and, in particular, to methods, systems, apparatus and devices for manipulating with light beams, including laser beams and beams with wide spectra and divergence angles, by translating them in the lateral direction and varying their propagation direction over large angles for optical switching, beam scanning, spectral modulation, optical tweezers, thermal seeker, imaging, information displays, and other photonics applications.

BACKGROUND OF THE INVENTION

The present invention relates to optical systems for controlling with propagation of light beams. Pointing and positioning systems are enabling components for most laser applications. Conventionally, this is accomplished using mirrors, scan wheels, optical wedges, and other two-axis gimbal arrangements as exemplified, for example, in the U.S. Pat. No. 7,319,566 to Prince et al. These opto-mechanical systems are complex, bulky and heavy for large area beams. For example, the prism apex angle, hence its thickness is increased to achieve larger deflection angles. The electromechanical systems for rotation, translation or oscillation of such mirrors, prisms, and other optical components require high electrical power for their operation. They are relatively slow and have limited range of angles that could be covered within given time period.

Thus, there is a need for thin, light-weight, fast, and inexpensive pointing, positioning, and switching systems for light beams, particularly, for laser beams. The state-of-the-art developments include all-electronics systems and rotating diffraction gratings. The all-electronics systems with no moving parts, as reviewed in P. F. McManamon, P. J. Bos, M. J. Escuti, J. Heikenfeld, S. Serati, H. Xie, E. A. Watson, A Review of Phased Array Steering for Narrow-Band Electrooptical Systems, Proceedings of the IEEE, Vol. 97, pages 1078-1096 (2009), require a large number of high efficiency diffraction gratings and spatial light modulators and/or electrically controlled waveplates. As a result, the overall transmission of these systems is reduced along with their radiation damage threshold, and their speed is limited by the liquid crystal spatial light modulators and variable retarders.

Rotating diffraction gratings as described in J. C. Wyant, "Rotating diffraction grating laser beam scanner," Applied Optics, 14, pages 1057-1058 (1975), and in the U.S. Pat. No. 3,721,486 to Bramley, partially solves the problem of obtaining larger diffraction angle in thinner optical system, compared, for example to the system of Risley prisms. The light beam diffracted by the first grating in the path of the beam is further diffracted by the second grating. Depending on orientation of those gratings with respect to each other, the deflection angle of the beam can thus be varied between nearly 0 to double of the diffraction angle exhibited by a single grating. The problem with such systems is that phase gratings typically diffract light into multiple orders that need to be blocked along with the $0^{th}$ order beam. High efficiency Bragg type gratings have narrow spectral and angular range as described in the U.S. Pat. No. 7,324,286 to Glebov et al., and can be used practically for laser beams only, expanded and collimated to minimize divergence. Blazed gratings such as proposed in the U.S. Pat. No. 6,792,028 to Cook et al., still exhibit a multitude of diffraction orders due to their discontinuous structure and do not improve considerably on angular selectivity and efficiency.

The cycloidal diffractive waveplates (DWs), essentially, anisotropic plates meeting half-wave condition but with optical axis orientation rotating in the plane of the waveplate in a cycloidal manner, as described in the review S. R. Nersisyan, N. Y. Tabiryan, D. M. Steeves, B. R. Kimball, "Optical Axis Gratings in Liquid Crystals and their use for Polarization insensitive optical switching," J. Nonlinear Opt. Phys. & Mat., 18, 1-47 (2009), do not have the disadvantages of conventional phase gratings. Moreover, DWs, referred to also as optical axis gratings and polarization gratings, can provide nearly 100% diffraction efficiency in micrometer thin layers. Furthermore, due to their waveplate nature, their diffraction spectrum is broadband, and can even be made practically achromatic. Due to their thinness and high transparency, they can be used in high power laser systems.

Thus, replacing Risley prisms, wedges, mirrors and/or phase gratings with DW s, provides many advantages for manipulating with light beams and imaging. As shown in S. R. Nersisyan, N. Y. Tabiryan, L. Hoke, D. M. Steeves, B. Kimball, Polarization insensitive imaging through polarization gratings, Optics Express, 17, 1817-1830 (2009), not only laser beams, but complex images can be steered over large angles without light attenuation or image deformation. That paper further showed that utilizing a pair of closely spaced DWs, one of them with switchable characteristics, it is possible to manipulate with transmission of unpolarized beams and images. This concept suggested and demonstrated in S. R. Nersisyan, N. Y. Tabiryan, L. Hoke, D. M. Steeves, B. Kimball, "Polarization insensitive imaging through polarization gratings," Optics Express, 17, 1817-1830 (2009) was subsequently cited and tested in C. Oh, J. Kim, J. P. Muth, M. Escuti, "A new beam steering concept: Riesley gratings," Proc. SPIE, vol. 7466, pp. 74660JI-J8 (2009).

BRIEF SUMMARY OF THE INVENTION

Thus, the objective of the present invention is providing means for switching and manipulating with light beams and images in lateral and angular space using a set of DW s capable of deflecting nearly 100% of light using thin material layers for a broad band of wavelengths and divergence angles.

The second objective of the present invention is incorporating in said set DWs with controlled characteristics of their optical properties for further enhancing optical manipulation capabilities of said systems.

A further objective of the present invention is providing optical systems, incorporating said DW set, wherein manipulation of light and images with the DW set is transformed into transmission modulation at the output of the optical system.

DETAILED DESCRIPTION OF THE INVENTION

Before explaining the disclosed embodiment of the present invention in detail it is to be understood that the invention is not limited in its application to the details of the particular arrangement shown since the invention is capable of other embodiments. Also, the terminology used herein is for the purpose of description and not limitation.

Figure 1A:
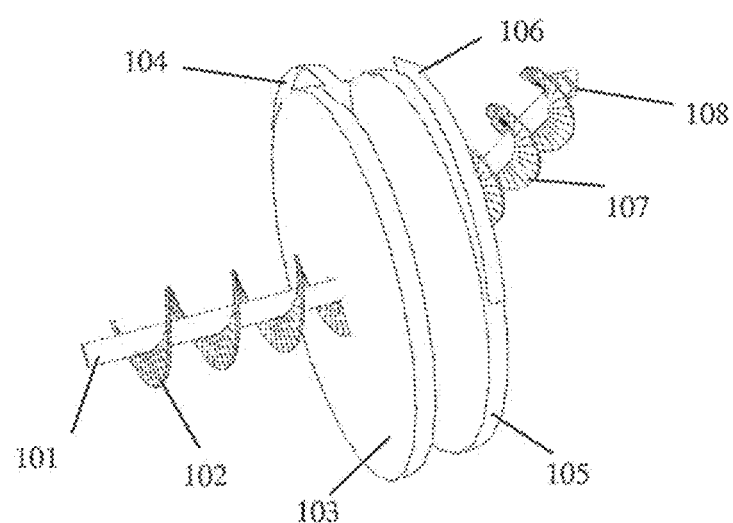
FIG. 1A schematically shows deflection of a circularly polarized light beam with a pair of diffractive waveplates.
Figure 1B:
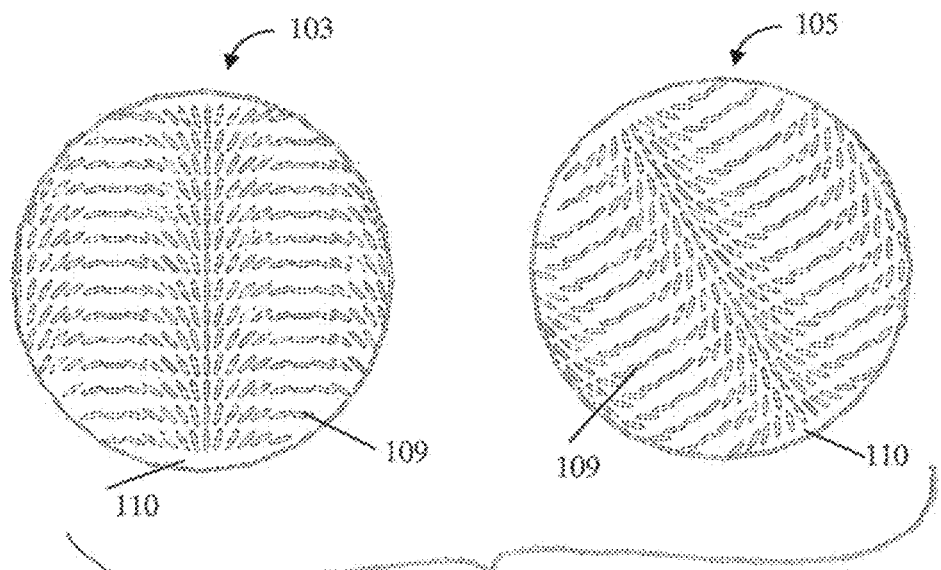
FIG. 1B schematically shows the structure of diffractive waveplates at different rotational positions.

The preferred embodiment of the present invention includes two DWs, marked with numerals 103 and 105 in FIG. 1A, arranged parallel to each other in close proximity. At the output of the system of DWs 103 and 105, the pointing direction of the light beam 108, circularly polarized as shown by spirals 102 and 107, is, in general, different from that of the propagation direction of the light beam 101 incident on the system, controlled with relative rotational positions of the DWs as schematically shown by arrows 104 and 106. The optical axis orientation pattern corresponding to different rotational positions of said DWs is shown in FIG. 1B wherein the axes of elongated ellipses 109 correspond to local optical axis orientation direction. In the preferred embodiment, DWs are made of liquid crystal polymers though other optically anisotropic materials and material structures such as subwavelength gratings can be used as well. In general, the layer of DW, typically only a few micrometer thick, is coated on a substrate 110 for stability and robustness. The substrate can be made of a material adequate for the particular application. As an example, a fused silica can be used when controlling UV light beams, and highly transparent glass materials with low absorption can be used for controlling high power laser beams.

Figure 2A:
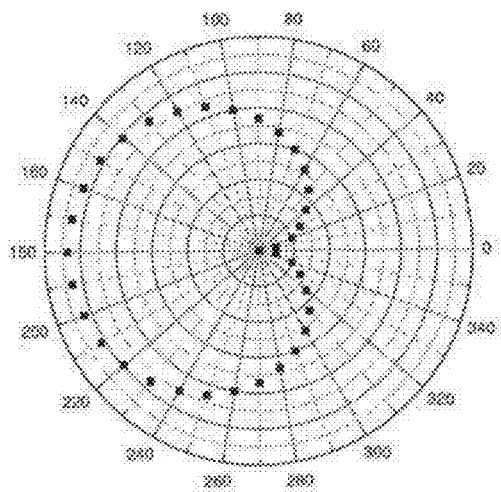
FIG. 2A shows sample dependence of the propagation angle of a light beam at the output of a pair of diffractive waveplates as a function of the rotational position between the waveplates.
Figure 2B:
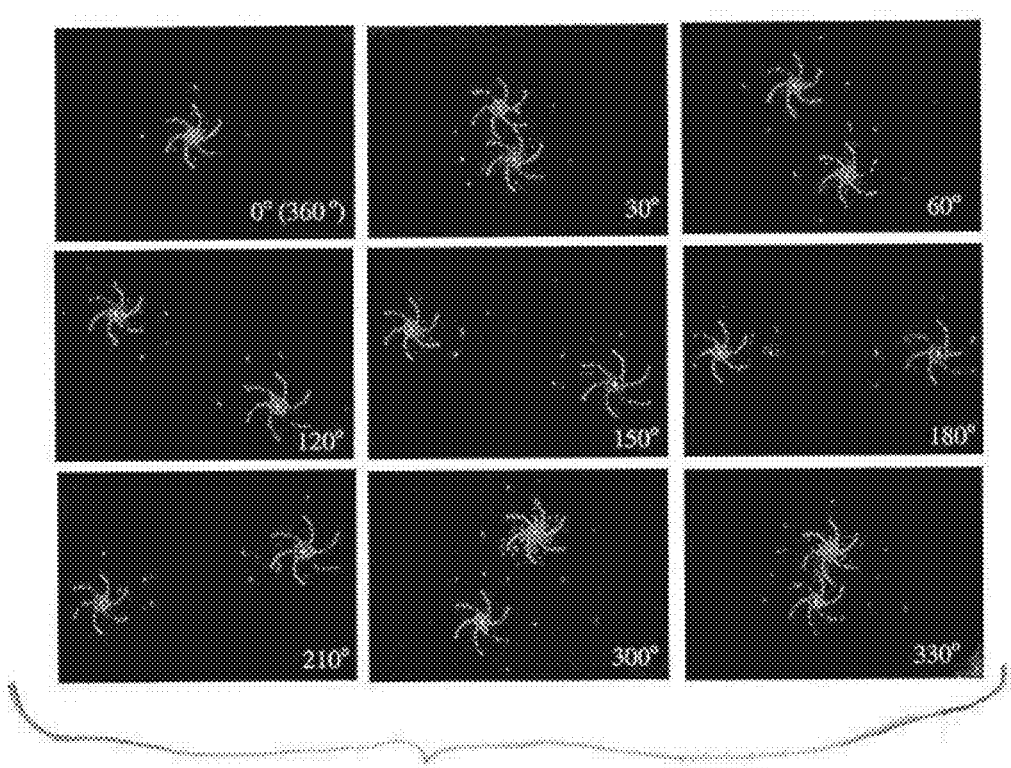
FIG. 2B demonstrates the capability of a pair of diffractive waveplates to steer with no distortions complex images carried by an unpolarized light.

The plot of output angles measured for a sample system as a function of angular position between the DWs in S. R. Nersisyan, N. Y. Tabiryan, L. Hoke, D. M. Steeves, B. Kimball, "Polarization insensitive imaging through polarization gratings," Optics Express, 17 (3), 1817-1830 (2009) is shown in FIG. 2A for normal incidence of the beam on the first DW. In the setup shown in FIG. 1A, the polarization of the incident beam is assumed circular, as schematically shown by the spiral 102. The output beam 108 in this case maintains the circular polarization state 107. In case of incident unpolarized or linearly polarized beam, two beams of orthogonal circular polarization are generated at the output of the system of two DWs, and the angle between them changes from nearly 0 to nearly double of the diffraction angle depending on relative rotational positions between the DWs as shown in FIG. 2B for light beam carrying a complex image. No image distortions occurs in this process.

Figure 3A:
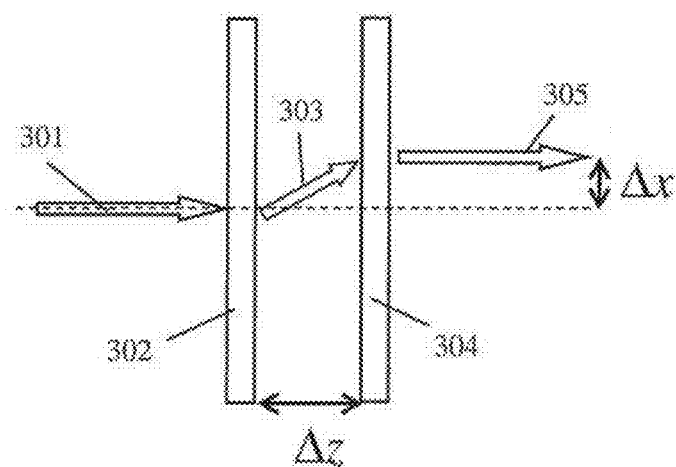
FIG. 3A schematically shows the displacement of a light beam by a pair of diffractive waveplates with parallel orientation of their optical axis modulation directions.
Figure 3B:
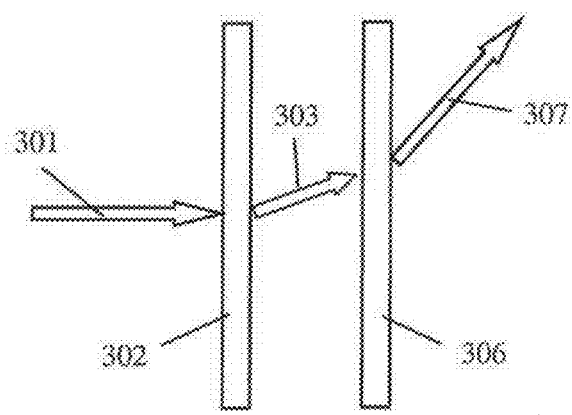
FIG. 3B schematically shows the increase in the resultant deflection angle of a light beam by a pair of diffractive waveplates with anti-parallel orientation of their optical axis modulation directions.
Figure 3C:
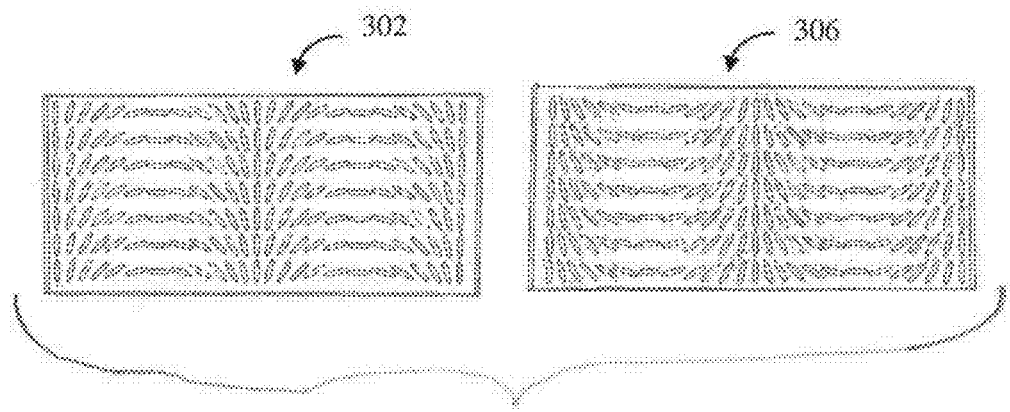
FIG. 3C shows the optical axis orientation pattern in diffractive waveplates with antiparallel orientation of their optical axis modulation directions.
Figure 4A:
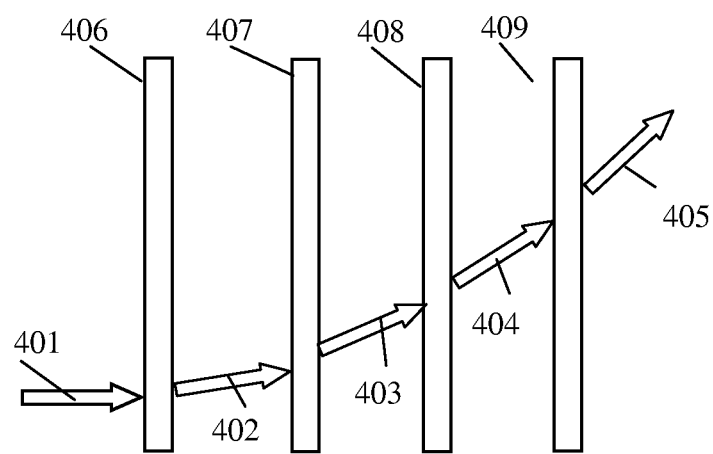
FIG. 4A schematically shows increasing of the deflection angle of a light beam by a set of four diffractive waveplates each arranged anti-parallel with respect to the previous one.
Figure 4B:
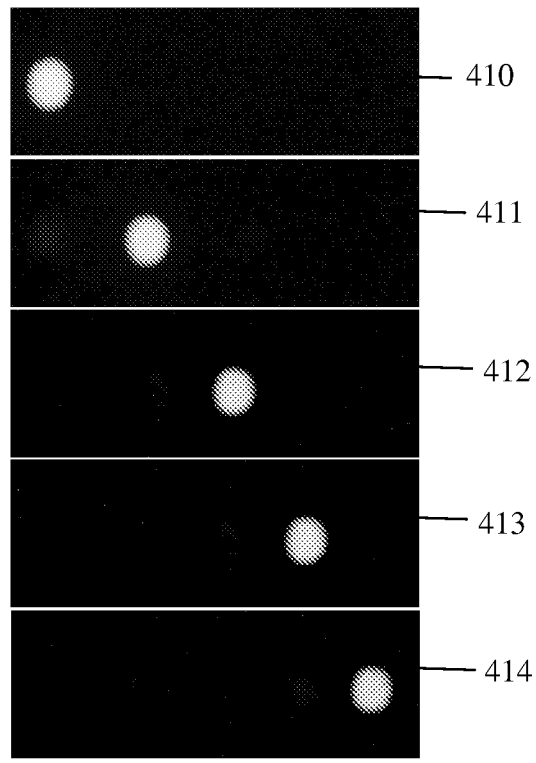
FIG. 4B demonstrates increasing deflection angle of a light beam by increasing the number of diffractive waveplates from one to four, and comparing them to the original propagation direction of the beam.
Figure 5:
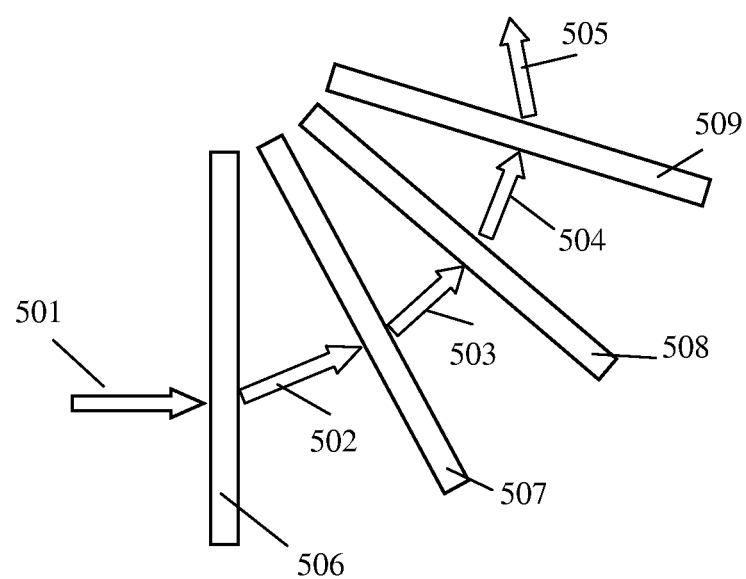
FIG. 5 shows increasing deflection angle of a light beam by a system of diffractive waveplates tilted with respect to each other.

Increasing the distance $\Delta z$ between two identical DWs 302 and 304, FIG. 3, introduces transverse shift $\Delta x$ of the beam 305 emerging from the system with respect to the position of the input beam 301 as a result of generation of deflected beam 303 by the first DW 302. Said emerging beam 305 propagates parallel to the input beam 301 in case the optical axis modulation directions of DW s 302 and 304 are parallel, FIG. 3A, and the beam 301 changes in propagation direction into the beam shown as 307 when the DW 304 is rotated with respect to DW 302 into a new position 306, FIG. 3B. The overall deflection angle of the output beam 307 can be maximized positioning the output DW 306 anti-parallel with respect to the input DW 302. The optical axis alignment patterns for anti-parallel DWs 302 and 306 are schematically shown in FIG. 3C. The beam can be steered over arbitrarily large angles by adding DWs into the system. Four DWs, 406-409, are shown in FIG. 4A as an example. The input light 401 undergoes four deflections, 402-405. In order for each subsequent deflection to further increase the resultant deflection angle, the DWs 407 and 409 have to be arranged anti-parallel to DWs 406 and 408. A demonstration of light deflection by such a system of four DWs is shown in FIG. 4B where the five spots 410, 411, 412, 413, 414 correspond to the photos of the beams 401, 402, 403, 404 and 405 FIG. 4A obtained on the fixed screen. In general, DWs can be tilted with respect to each other such as each of the subsequent DWs is nearly perpendicular to the beam deflected by the previous DW. The DWs 507 and 509 are anti-parallel to the DWs 506 and 508, and all four deflected beam 502-505 of the input beam 501 result in increasing total deflection angle.

In another embodiment, one or more DWs in a system can be switched between diffractive and non-diffractive states, optically, thermally, electrically, mechanically, or by any other means, due the effect of external stimuli on optical anisotropy and optical axis orientation modulation pattern. For example, the DW can be made of azobenzene liquid crystal polymer that can be transformed into isotropic state or realigned by light beams as discussed in S. R. Nersisyan, N. Y. Tabiryan, D. M. Steeves, B. R. Kimball, "Optical Axis Gratings in Liquid Crystals and their use for Polarization insensitive optical switching," J. Nonlinear Opt. Phys. & Mat., 18, 1-47 (2009). Alternatively, DWs can be transformed into homogeneous orientation state by electrical fields if they are made of liquid crystals or liquid crystal polymer network materials.

Figure 6A:
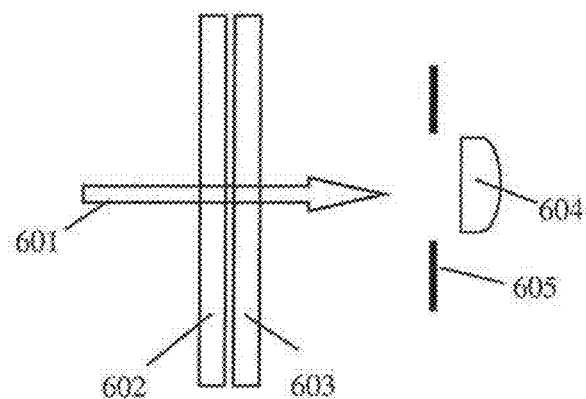
FIGS. 6A, 6B and 6C schematically show switching between transmittive and deflective states of a pair of diffractive waveplates when switching one of the diffractive waveplates into an optically homogeneous non-diffractive state as shown in 6C.
Figure 6B:
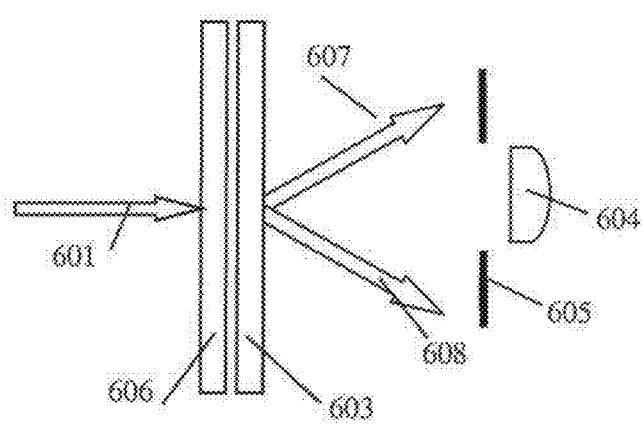
Figure 6C:
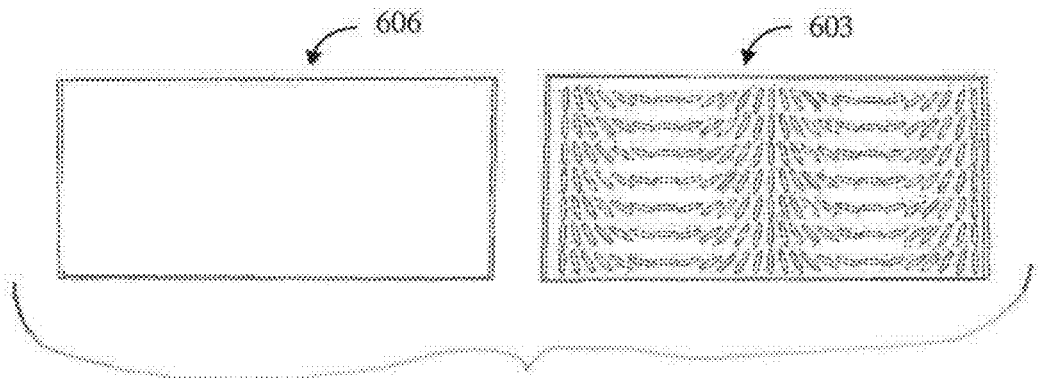

Particularly important is the case shown in FIG. 6 when a DW 603 with a fixed diffractive property is paired with a controllable DW 602 in configuration when their optical axis modulation directions are parallel. As noted in S. R. Nersisyan, N. Y. Tabiryan, L. Hoke, D. M. Steeves, B. Kimball, "Polarization insensitive imaging through polarization gratings," Optics Express, 17 (3), 1817-1830 (2009), this state corresponds to total cancellation of diffraction, and such a pair allows transmitting the light beam 601 through the system as shown schematically in FIG. 6A. An image sensor 604 furnished with an aperture 605 large enough not to block the transmitted beam would not register any distortions to the beam. In case the DW 602 is transformed into a non-diffractive state 606, the diffraction of, generally, an unpolarized light on the remaining DW 603 redirects the input beam 601 into diffracted beams 607 and 608 as shown in FIG. 6B, diffracting it into orthogonal circular polarized components in case of unpolarized or linearly polarized incident beam. No beam is acting on an image sensor 604 in this case provided the deflected beams propagate beyond the receiving aperture of the image sensor. Thus, the system described in FIG. 6 undergoes switching from high transmission to no or low-transmission state as a result of switching the structure of one of the DWs in the system from diffractive state 603 into a non-diffractive state 606, FIG. 6C. Indeed, such change in transmission through particular aperture can be obtained also by mechanically changing the rotational position of the DWs or the distance between them.

Figure 7:
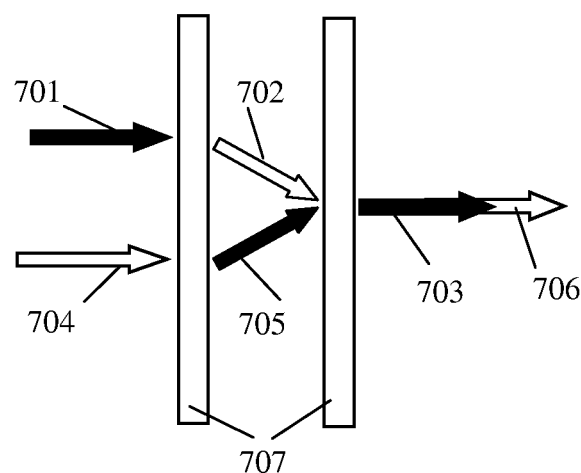
FIG. 7 shows a schematic of a beam combining function of a pair of diffractive waveplates.

Paired DWs and their systems can have many applications in photonics. A setup for beam combining is shown in FIG. 7. Two parallel propagating light beams of orthogonal circular polarizations 701 and 704, after being deflected by the first DW 707 are further deflected into beams 702 and 705, emerging as overlapping beams of the same propagation direction 703 and 706 by the second DW 707 in FIG. 7.

Figure 8A:
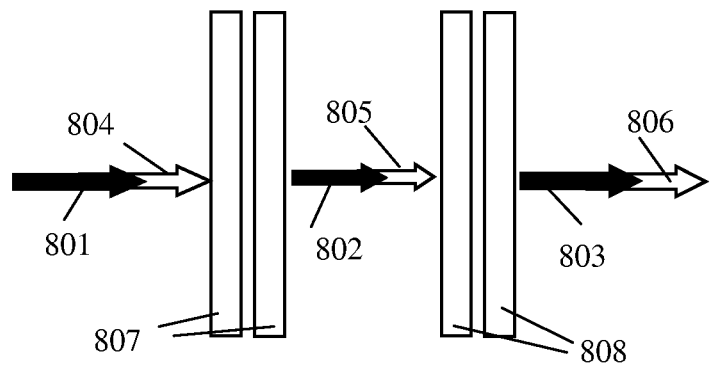
FIGS. 8A, 8B and 8C show a schematic of a system for controlling the spectrum of a light beam with the aid of a set of diffractive waveplates.
Figure 8B:
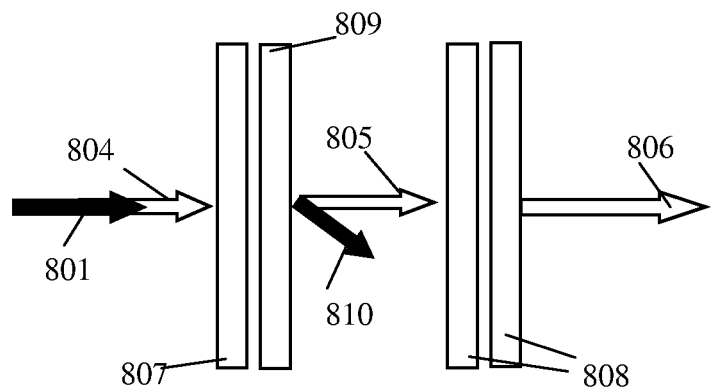
Figure 8C:
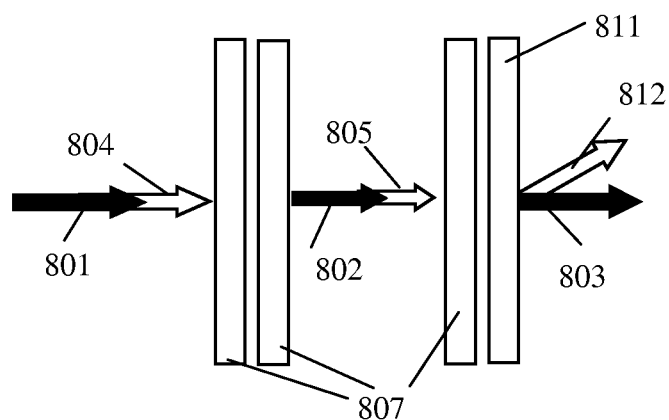

Given the thinness of individual DW layers, a multilayer system can be designed for spectrally selective switching without compromising the high throughput and the small size of the system. In the embodiment shown in FIG. 8, a set of DW pairs is used for controlling with the spectral content of the transmitted light by allowing light at different portions of the spectrum at least partially be deflected out of the system. The beams 801 and 804 in FIG. 8 are assumed to possess with different, non-overlapping, spectral content. The individual DWs in the first pair 807 are optimized for diffracting the light beam 801 while having diffraction spectrum out of the spectral range of the beam 804. The individual DWs in the second pair 808 are optimized for diffracting the light beam 804 while having diffraction spectrum out of the spectral range of the beam 801. Thus, when DWs in both pairs are parallel aligned with respect to their optical axis modulation direction, all the light is transmitted, and the spectral content of the output light is the same as in the input light. In this case shown in FIG. 8A, the input light 801 propagates through the first DW pair into the beam 802 without changing its propagation direction due to diffraction on both DWs constituting the pair 807. The beam 802 further propagates through the second DW pair 808 into the beam 803 without deflection since its spectrum is out of the diffraction spectrum of the second DW pair 808. Similarly, the input light 804 propagates through the first DW pair into the beam 805 without changing its propagation direction since its spectrum is out of the diffraction spectrum of the first DW pair 807. The beam 805 further propagates through the second DW pair 808 into the beam 806 due to the diffraction on both DWs constituting the pair 808.

In case one of the DWs constituting the first pair 807 is switched into nondiffractive state 809, or is rotated to double the diffraction angle of the beam 801 by the first DW in the pair 807, the beam 801 is diffracted out of the optical system into a beam 810. Propagation of the beam 804 is not affected by that. Thus the light spectrum obtained at the output of the optical system coincides with that of the beam 804, FIG. 8B.

In case one of the DWs constituting the second pair 808 is switched into nondiffractive state 811, or is rotated to double the diffraction angle of the beam 805 by the first DW in the pair 808, the beam 805 is diffracted out of the optical system into a beam 812. Propagation of the beam 802 is not affected by that. Thus the light spectrum obtained at the output of the optical system coincides with that of the beam 801, FIG. 8C.

Although the present invention has been described above by way of a preferred embodiment, this embodiment can be modified at will, within the scope of the appended claims, without departing from the spirit and nature of the subject invention.

The invention claimed is:

1. A system for positioning light beams comprising:
   (a) A light source irradiating a light beam;
   (b) a plurality of diffractive waveplates configured to receive and diffract the light beam;
   (c) means for independently controlling one or more diffractive properties of one or more of the plurality of diffractive waveplates.

2. The system of claim 1 further comprising means for shaping the light beam via controlling one or more of divergence, spectral content, polarization and profile.

3. The system of claim 1 wherein the plurality of diffractive waveplates comprises at least one pair of optically identical diffractive waveplates.

4. The system as in claim 1 wherein the means for independently controlling one or more diffractive properties of one or more of the plurality of diffractive waveplates comprises varying one or more of electric field, magnetic field, optical radiation, temperature and mechanical stress.

5. The system of claim 4 wherein the plurality of diffractive waveplates is deposited on a single substrate.

6. The system of claim 1 wherein the means for independently controlling one or more diffractive properties of one or more of the plurality of diffractive waveplates comprises varying one or more of temperature, mechanical rotation assembly and mechanical displacement assembly.

7. The system of claim 1 wherein the light beam is produced by a laser source with quasi-monochromatic spectrum.

8. The system of claim 1 wherein the light beam is produced by a source with broadband angular spectrum.

9. The system of claim 1 wherein the diffractive waveplates deflect light with nearly 100% efficiency in a broad spectrum of wavelengths.

10. The system of claim 8 wherein the light beam is produced by a source with broadband wavelength spectrum.

11. The system of claim 1 further comprising an optical setup for receiving and controlling light irradiated by the light source and emanating at the output of the plurality of diffractive waveplates, said optical setup including one or more of spatial filters, spectral filters, polarizers and diffraction gratings.

* * * * *